United States Patent Office 2,896,874
Patented July 28, 1959

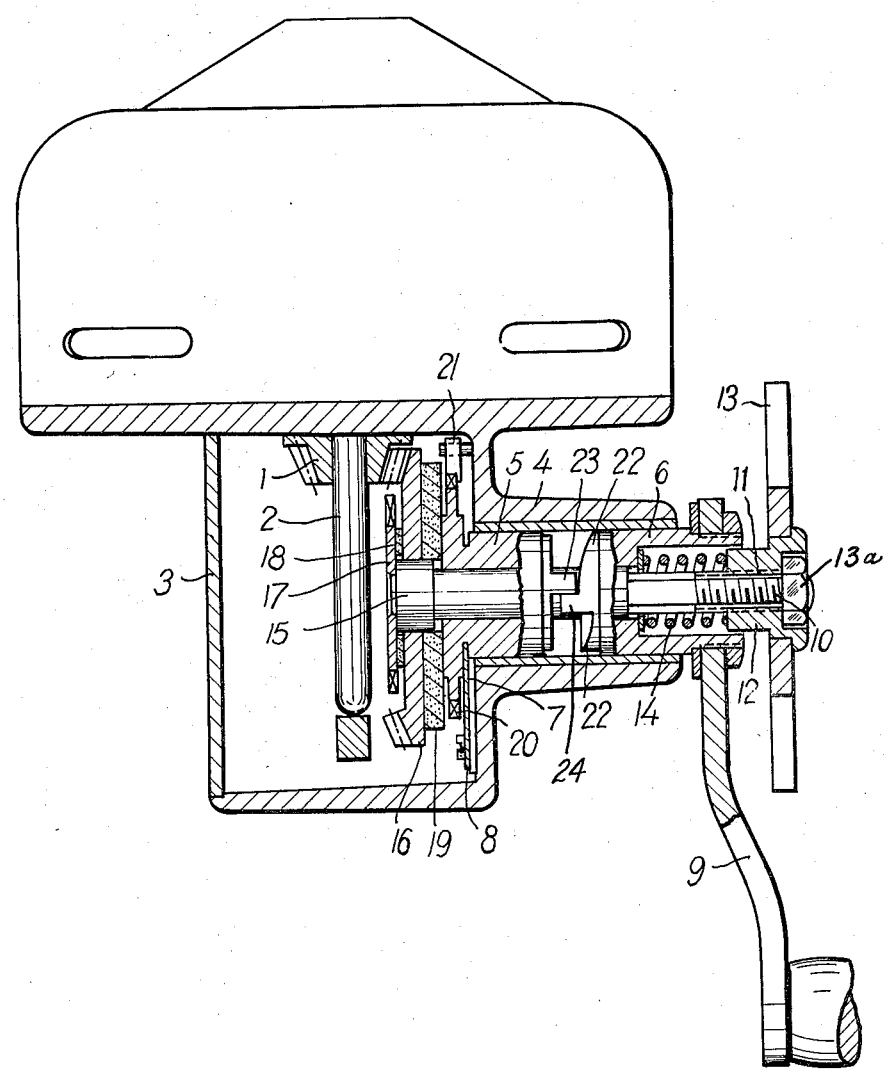

2,896,874

DRIVING MEANS FOR FISHING REELS

Karl Nurmse, Svangsta, Sweden, assignor to Ab Urfabriken, Svangsta, Sweden, a corporation of Sweden Application July 15, 1957, Serial No. 671,882

Claims priority, application Sweden July 16, 1956

3 Claims. (Cl. 242—84.45)

This invention relates to driving means for fishing reels. The invention is especially concerned with driving means of this kind in which the motion transmission means between a crank and a winding device comprise a rotatable member in positive driving relation with the winding device, said rotatable member being maintained by a spring in slidable frictional engagement with a driving part drivingly connected to the crank.

In known driving mechanisms of this kind the force which can be transmitted by frictional engagement between said driving member and said rotatable member without sliding of said parts relative to each other, i.e. the sliding limit of the force transmissible by the friction coupling formed by said parts, is the same during winding in of the line and during running out of the line by traction exerted thereon by the fish when the crank is stopped. For a determined initial tension of the spring the resistance on the line, at which the coupling begins to slide while the crank is operated is, however, much inferior to the traction which has to be exerted on the line to surmount the frictional engagement when the crank is kept motionless. If the frictional engagement is adjusted to give a sufficiently high sliding limit to permit the exertion of a traction on the line appropriate for the winding in of the fish, the frictional resistance is too large to permit the fish occasionally to rush out while drawing out the line. If, on the contrary, the frictional engagement is adjusted at a limit sufficiently low to obtain a resistance against drawing out of the line with a motionless crank, which resistance is adapted to the drawing strength of the fish, nearly no winding force is exerted to the winding mechanism when operating the crank and the winding in of the fish must be effected with slackened line. In both cases the fish is easily lost either by breaking off the line at a sudden rush of the fish or by shaking off the bait when the line is slackened.

The purpose of the present invention is to eliminate these drawbacks and to obtain such a construction of the driving means, that the winding device, when the crank is turned in the direction corresponding to the winding in of the line, is driven with a determined frictional force, which might be adjustable within certain limits from the outside of the device, and which is surmounted at an increasing traction on the line beyond this frictional force so that the friction coupling begins to slide, and that this frictional force, when the crank is turned in the direction opposite to the direction corresponding to the winding in of the line, is reduced to a lower value, which corresponds to a frictional resistance against drawing out of the line appropriate for the tiring out of the fish.

This purpose is essentially obtained by providing a spring acting in the direction of the axis of rotation of the crank adapted to resiliently maintain together the rotatable member connected to the winding means, a coupling member frictionally engaged with said rotatable member and a driving member positively operable by the crank, said coupling member and said driving member having projections engaging each other for the transmission of the motion of the crank but permitting a limited idle motion therebetween and cam guiding means producing at such idle motion of the driving member relative to the coupling member a variation of the space between the driving member and the coupling member such, that said space at the relative motion corresponding to a backward rotation of the crank is diminished whereby the tension of the spring and thereby the frictional engagement between the driving member and the coupling member is also diminished, and at a relative motion in the opposite direction the said space, spring tension and frictional engagement are increased.

The drawing illustrates a preferred embodiment of the invention in a side elevation of a reel partly in section through the axis of the crank shaft.

The reel itself is of known encased type and the winding mechanism itself, which has nothing to do with the present invention, can be of any known type. Only the driving shaft 2 of the winding mechanism and a bevelled gear 1 mounted thereon are shown in the drawing.

The driving mechanism of the reel is mounted in a casing 3 having a boss 4 serving as bearing for the crank shaft. The crank shaft is formed of two portions disposed axially one after the other, i.e. an inner portion 5 and an outer portion 6. The inner shaft portion 5 is secured against axial displacements in the bearing 4 by means of a forked plate 7 fixed at 8 in the housing 3 and engaging a peripheral groove in the inner shaft portion 5, without preventing said portion from rotating within the bearing. The outer crank shaft portion 6 is rotatably and axially displaceable within the bearing 4 and has its outer end outside the bearing provided with a crank 9. Both shaft portions 5 and 6 have axial borings serving as bearings for an inner shaft 10 extending through both shaft portions 5 and 6. The end of said inner shaft 10 projecting out of the outer end of the outer shaft portion 6 has a screw-threaded portion 11, on which is screwed the hub 12 of a star formed knob 13. A helical compression spring 14 is inserted between the inner end of the hub 12 and the bottom of a cylindrical counterbore in the outer end of the outer crank shaft portion 6. The initial tension of the spring 14 can be adjusted by turning the knob 13. A nut 13a screwed on and secured to the outer end of the inner shaft 10 prevents the knob and hub element 12—13 from being screwed off entirely. The inner end of the inner shaft 10 projecting inside the inner end of the inner crank shaft portion 5 has a cylindrical, widened portion 15, on which a gear wheel 16, permanently meshing with the bevelled gear 1 of the winding mechanism, is mounted for free rotation. On the innermost end of the inner shaft 10 is mounted a plate 17. Between this plate 17 and the inner plane face of the gear wheel 16 is mounted a friction pad 18 and between the outer face of the gear wheel 16 and the inner end face of the inner crank shaft portion 5 is mounted another friction pad 19. The inner portion of the inner shaft portion 5 located inside the housing 3 has further a toothed ring 20 cooperating with a pawl 21 mounted within the housing 3 and preventing the inner crank shaft portion 5 from rotation in the direction of the rotation of the gear wheels 1 and 16 when the line is drawn out and thus also to be rotated by means of the crank 9 when rotating the latter backwards in the direction, which would correspond to the unwinding of the line.

The pressure exerted by the spring 14 on the hub 12 of the knob 13 is transmitted by the nut 13a and the inner shaft 10 to the plate 17 which by means of the friction pad 18 and the gear wheel 16 presses the second friction pad 19 against the inner end face of the inner crank shaft portion 5. The counter-action of the spring 14 exerted onto the bottom of the cylindrical counterbore of the outer crank shaft portion 6 maintains a double axial cam surface 22 on the inner end of the outer crank shaft portion 6 in engagement with two abutments 23 projecting axially outwards from the outer end of the inner crank shaft portion 5. Of these two abutments 23 only one is visible on the drawing, the other being hidden behind the inner shaft 10. The outer crank shaft portion 6 has its inner end facing the inner crank portion 5 provided with two corresponding abutments 24. The abutments 23 and 24 are adapted to transmit a rotation of the outer crank-shaft portion 6 to the inner crank shaft portion 5. They are of so little peripheric extension, that they permit a limited idle rotation of the outer shaft portion 6 relative to the inner shaft portion 5 when changing the sense of rotation of the outer shaft portion 6.

In the positions of the parts illustrated in the drawing the end surfaces of the abutments 23 engage the top ends of the helical cam surfaces 22 and abut with their side surfaces, turned backwards relative to the direction of rotation for winding in the line, against the side surfaces of the abutments 24. When, starting from this position, the crank 9 is turned in a direction opposite the winding in direction, i.e. in the counterclockwise direction when seen axially from the right side as shown in the drawing, the abutments 23 on the inner crank shaft portion 5, which is prevented from rotation in the same direction by the pawl 21, will slide with their end surfaces along the cam surfaces 22 towards the lower portions thereof, thus permitting the outer crank shaft portion 6 to be displaced axially towards the inner crank shaft portion 5 by the spring 14, whereby the tension of the spring is released by a certain amount and thus the pressure transmitted by the parts 13a, 10 and 17 on the friction coupling 18, 16, 19, 5 is correspondingly diminished. When the abutments 24 after traversing the spaces between the abutments 23 abut against the opposite faces of the latter, any further rotation of the crank 9 in the backward direction is prevented by the pawl 21. During the backward rotation of the crank just described the frictional resistance against sliding of the friction coupling is reduced from a value previously adjusted by means of the members 11, 12, 13 to correspond to the necessary winding in force to a lower value appropriate for the running out of the line when the fish makes a rush outwards. When the crank 9 after such a backwards rotation is again turned in the direction for winding in the line (clockwise direction seen from the right in the drawing) the cam surfaces 22 and abutments 24 on the outer crank shaft portion 6 are first turned back to their initial position against the abutments 23 whereby the tension of the spring is again increased to its initial value, to which it had been adjusted before turning backwards of the crank. When the crank 9 is operated further in the same direction after the abutments 24 have again reached the abutments 23 in the manner illustrated, the inner crank shaft portion 5 and the gear wheel 16 will again be coupled together with the greater frictional force so that the winding mechanism is operated for winding in the line with the force necessary for fetching in the fish.

The sliding limit of the friction coupling can be adjusted to any desired intermediate value between the maximum value for winding in and (at a determined position of the knob 13) the minimum value obtainable by a complete backwards operation of the crank above described. This is obtained by operating the crank only a corresponding portion of the possible relative motion between the two crank shaft portions 5 and 6. As soon as the crank 9, after such partial motion backwards, is again turned forwards, the initial maximum value is automatically restored. At the beginning of the winding in of the fish the sliding limit of the friction coupling can be adjusted by means of the knob 13 to the desired value according to the size of the fish and to the strength of the line, whereby simultaneously a corresponding adjustment of the least sliding limit at the backwards operation of the crank is obtained.

The difference between the sliding limits of the friction coupling during winding in and during running out of the line being essentially dependent of the resistances within the reel itself, the height of the cam surfaces 22 or their pitch can be determined in accordance with the conditions of the construction, so that any desire to change this difference at use generally does not exist.

The protection of the appending claims is not limited to the embodiment above described and illustrated in the accompanying drawings. The means for transforming the tension of the spring into a frictional engagement between the gear wheel 16 and the inner crank shaft portion 5 might be of any other design and can possibly be of a type known in itself. Even the means for adjusting the initial tension of the spring can be of other construction than illustrated and described above. Further the position of the spring in relation to the crank shaft portions, the inner shaft and the gear wheel can be different from the above described embodiment. The invention, which is to be seen in the means for changing the sliding limit of the friction coupling, can also be adapted to any other reel driving mechanism comprising a driving crank, a crank shaft and a motion transmission element driven through a friction coupling. Even the parts, forming essential elements of the invention, i.e. the cam surface or surfaces and the abutments can be subjected to changes in number and axial actioning direction without departing from the scope of protection as defined in the following claims.

What I claim is:

1. A driving mechanism for a fishing reel rotatably mounted in a frame comprising a driving gear rotatably mounted in said frame for driving said reel; a first crank shaft member rotatably mounted in said frame colinearly with respect to said driving gear, said first crank shaft member being also axially movable within said frame; a second crank shaft member rotatably mounted in said frame colinearly with respect to said driving gear intermediate said driving gear and said first crank shaft member, said first and second crank shaft members having cooperating axial abutments at adjacent ends thereof causing said second shaft member to be rotated in a reel winding direction upon rotation of said first crank shaft member in the reel winding direction; pawl means preventing rotation of said second crank shaft member in the opposite direction; spring means maintaining said gear in frictional engagement with said second crank shaft member comprising a rod longitudinally slidable with respect to and coaxially extending through said second and first shaft members, said gear being mounted on one end of said rod, and a spring at the other end of said rod axially biasing said first crank shaft member into abutment engagement with said second crank shaft member; and means for increasing the tension of said spring means comprising cam surfaces on the adjacent ends of said fist and second crank shaft members to axially displace said first crank shaft member away from said second shaft member upon rotation of said first crank shaft member in the winding direction.

2. A fishing reel driving mechanism as defined in claim 1 wherein the end of said rod extending through said first crank shaft member is screw-threaded and has a nut threadably mounted thereon, said spring being mounted intermediate said nut and said first crank shaft member, whereby the tension of said spring may be accurately adjusted by the longitudinal position of said nut on said rod according to the size of the fishing line and the size of the catch expected.

3. Apparatus as defined in claim 2 and further including a friction disk intermediate said driving gear and said second crank shaft member.

References Cited in the file of this patent

UNITED STATES PATENTS

| | | |
|---|---|---|
| 2,055,448 | Adams | Sept. 22, 1936 |
| 2,569,006 | King | Sept. 25, 1951 |

FOREIGN PATENTS

| | | |
|---|---|---|
| 589,703 | France | Feb. 26, 1925 |